(12) United States Patent
Awadallah-F et al.

(10) Patent No.: US 8,877,826 B2
(45) Date of Patent: Nov. 4, 2014

(54) ELECTROCHEMICAL POLYMERIZATION PROCESS FOR PREPARATION OF CROSSLINKED GEL

(71) Applicant: Qatar University, Doha (QA)

(72) Inventors: Ahmed Awadallah-F, Doha (QA); Shaheen A. Al-Muhtaseb, Doha (QA)

(73) Assignee: Qatar University, Doha (QA)

( * ) Notice: Subject to any disclaimer, the term of this patent is extended or adjusted under 35 U.S.C. 154(b) by 23 days.

(21) Appl. No.: 13/726,119

(22) Filed: Dec. 23, 2012

(65) Prior Publication Data
US 2013/0225709 A1 Aug. 29, 2013

(51) Int. Cl.
*C08G 8/00* (2006.01)
*C08G 8/22* (2006.01)

(52) U.S. Cl.
CPC ........................................ *C08G 8/22* (2013.01)
USPC .............. 521/181; 205/419; 528/86; 528/129

(58) Field of Classification Search
USPC ....................... 521/181; 205/419; 528/86, 129
See application file for complete search history.

(56) References Cited

U.S. PATENT DOCUMENTS

| | | | |
|---|---|---|---|
| 4,873,218 A | 10/1989 | Pekala | |
| 4,997,804 A | 3/1991 | Pekala | |
| 5,945,084 A * | 8/1999 | Droege | ....................... 423/447.4 |
| 6,924,322 B2 | 8/2005 | Fox et al. | |
| 2002/0173554 A1 | 11/2002 | Baumann et al. | |
| 2005/0004336 A1 | 1/2005 | Mabrouk | |

OTHER PUBLICATIONS

Phillips et al. (J. of poly. Sci.: poly. chem., vol. 12, 1193-1202, 1974).*
Al-Muhtaseb et al., "Preparation and Properties of Resorcinol-Formaldehyde Organic and Carbon Gels", Advanced Materials, 2003: 15(2), pp. 101-114.
Awadallah-F et al., "Carbon dioxide sequestration and methane removal from exhaust gases using resorcinol-formaldehyde activated carbon xerogel." Adsorption, 2013: 19(5), pp. 967-977.
Awadallah-F et al., "Influence of Micro-and Mesoporosity of Resorcinol-Formaldehyde Xerogels on Adsorption." Environmental Engineering Science, 2013: 30(7), pp. 381-386.
Awadallah-F et al., "Nanofeatures of resorcinol-formaldehyde carbon microspheres." Materials Letters, 2012: 87, pp. 31-34.
Elkhatat, "Advances in Tailoring Resorcinol-Formaldehyde Organic and Carbon Gels", Advanced Materials, 2011: 23(6), pp. 2887-2903.
Kirk-Othmer Encyclopedia of Chemical Technology, 2002: 13, http://onlinelibrary.wiley.com/doi/10.1002/0471238961.0825041807211620.a01/pdf.
Park et al., Hydrogels, Definition, Hydrogel as a Biomaterial, Biodegrad Able Hydrogels, Biodegradation, in Biodegradable Hydrogels for Drug Delivery (Eds. K. Park, W. C. W. Shalaby and H. Park), Technomic, Lancaster, 1993, pp. 1-12.

(Continued)

*Primary Examiner* — Shane Fang
(74) *Attorney, Agent, or Firm* — Squire Patton Boggs (US) LLP

(57) ABSTRACT

Systems and methods for the electrochemical polymerization process for preparation of cross-linked gel. The process includes mixing a hydroxylated benzene and aldehyde in an aqueous media in an inert container to form a hydroxylated benzene and aldehyde mixture. Furthermore, the process includes introducing electrodes into the inert container. Further, the electrochemical polymerization process includes supplying electric current to the hydroxylated benzene and aldehyde mixtures in the inert container through the electrodes. The resultant products of electrochemical polymerization process either gels or activated carbon gels have unique characteristics.

16 Claims, 11 Drawing Sheets

(56) References Cited

OTHER PUBLICATIONS

Peppas et al., Preparation Methods, and Structure of Hydrogels, in Hydrogels in Medicine and Pharmacy (Ed. N. A. Peppas), vol. 1, CRC Press, Boca Raton 1986, pp. 1-25.

Roorda et al., "Synthetic hydrogels as drug delivery systems. Pharmacy World & Science," 1986: 8, pp. 165-89.

Shin et al., "Gradual phase transition of poly(N-isopropylacrylamide-co-acrylic acid) gel induced by electric current", European Polymer Journal, 2003: 39(3), pp. 579-584.

* cited by examiner

ELECTROCHEMICAL POLYMERIZATION PROCESS FOR PREPARATION OF CROSSLINKED GEL

FIELD OF THE INVENTION

The present invention generally relates to organic gels, and, more specifically, to cross-linked gels prepared by electrochemical polymerization process.

BACKGROUND OF THE INVENTION

Cross-linked gels are materials which exhibit solid-like behavior resulting from continuous, three-dimensional network extending throughout a liquid. This network consists of molecules interconnected through multifunctional junctions. These junctions can be formed through covalent crosslinking, crystallization, ionic interactions, hydrogen bonding, chain entanglements, and the like.

One such cross-linked gel is resorcinol-formaldehyde gel. The resorcinol-formaldehyde cross-linked gel has numerous applications as ion exchange resins, water-based resin coatings, solvent based coating resins, resin coatings, etc. Further, the resorcinol-formaldehyde gels as carbonized products including carbon gels and activated carbon gels have their use as super capacitors, gas sensors, catalyst supports, chromatographic packing, thermal insulators, carbon black particles for reinforcing rubbers or plastics, carbon fibers for spacecraft shields, adsorbents, electrodes, Cherenkov detectors, casting molds, energy absorbers, hypervelocity particle traps, dielectrics for filters, spacers for vacuum electrodes, vacuum display spacers, pipes, and the like.

Conventionally, the resorcinol-formaldehyde cross-linked gel is prepared by a chemical process. U.S. Pat. No. 4,873,218 ('218 patent) discloses a method for preparation of resorcinol-formaldehyde cross-linked gels which includes polycondensation of resorcinol with formaldehyde under alkaline conditions. This results in formation of surface functionalized polymer "clusters". Subsequent covalent crosslinking of these "clusters" produces gels which when processed under super critical conditions; produce low density, organic aerogels.

However, the chemical process of preparation of the resorcinol-formaldehyde cross-linked gels described in '218 patent requires precise control of various parameters, including composition of the chemicals, for example, resorcinol, formaldehyde and water, type and concentration of a catalyst, pH of the reacting mixture solution and surrounding temperature. Small variation in any of these abovementioned parameters completely changes characteristics of the final resorcinol-formaldehyde cross-linked gel products. This makes the structural and physical properties of the corresponding resorcinol-formaldehyde cross-linked gels difficult to control, non-friendly for environment, full of residues of additives and not always reproducible as well.

Further, the resorcinol-formaldehyde cross-linked gel synthesized with the chemical process of the prior art usually undergoes substantial shrinkage of, distortion of and cracking of their pore structures upon drying at ambient conditions. Also, pore structures of the resorcinol-formaldehyde cross-linked gel synthesized by the chemical process is difficult to sustain unless by drying them at supercritical conditions which, in turn, requires complicated, expensive and lengthy, tedious, procedures which cannot be applied easily on commercial scales.

A need exists therefore for providing cross-linked gels having sustainable structural properties, enhanced thermal stability, low cost, clean, easy synthesis on mass production, controllability of pore and particle structures, which overcomes the drawbacks of the prior art.

SUMMARY OF THE INVENTION

To achieve the foregoing and other objects, in one aspect, the present invention provides an electrochemical polymerization process for preparation of a cross-linked gel. The process includes mixing a hydroxylated benzene and an aldehyde in an aqueous media in an inert container to form a hydroxylated benzene and aldehyde mixture. Further, the process includes introducing two electrodes into the inert container. Moreover, the process includes supplying electric current to the hydroxylated benzene and aldehyde mixture in the inert container through the two electrodes.

In another aspect, the present invention provides a resorcinol-formaldehyde cross-linked gel prepared by electrochemical polymerization process. The resorcinol-formaldehyde cross-linked gel is characterized by Fourier Transform Infra Red (FTIR) peaks at 294 $cm^{-1}$, 2874 $cm^{-1}$, 1479 $cm^{-1}$, 1624 $cm^{-1}$, 3444 $cm^{-1}$, 1222 $cm^{-1}$ and 1092 $cm^{-1}$.

These together with other objects of the invention, along with the various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there are illustrated exemplary embodiments of the present invention.

BRIEF DESCRIPTION OF THE DRAWINGS

While the specification concludes with claims that particularly point out and distinctly claim the invention, it is believed the exemplary embodiments of the present invention can be understood from the following detailed description and claims taken in conjunction with the accompanying drawings. The drawings and detailed description which follow are intended to be merely illustrative of the exemplary embodiments and are not intended to limit the scope of the invention as set forth in the appended claims. In the drawings:

DETAILED DESCRIPTION OF THE INVENTION

Figure 1:
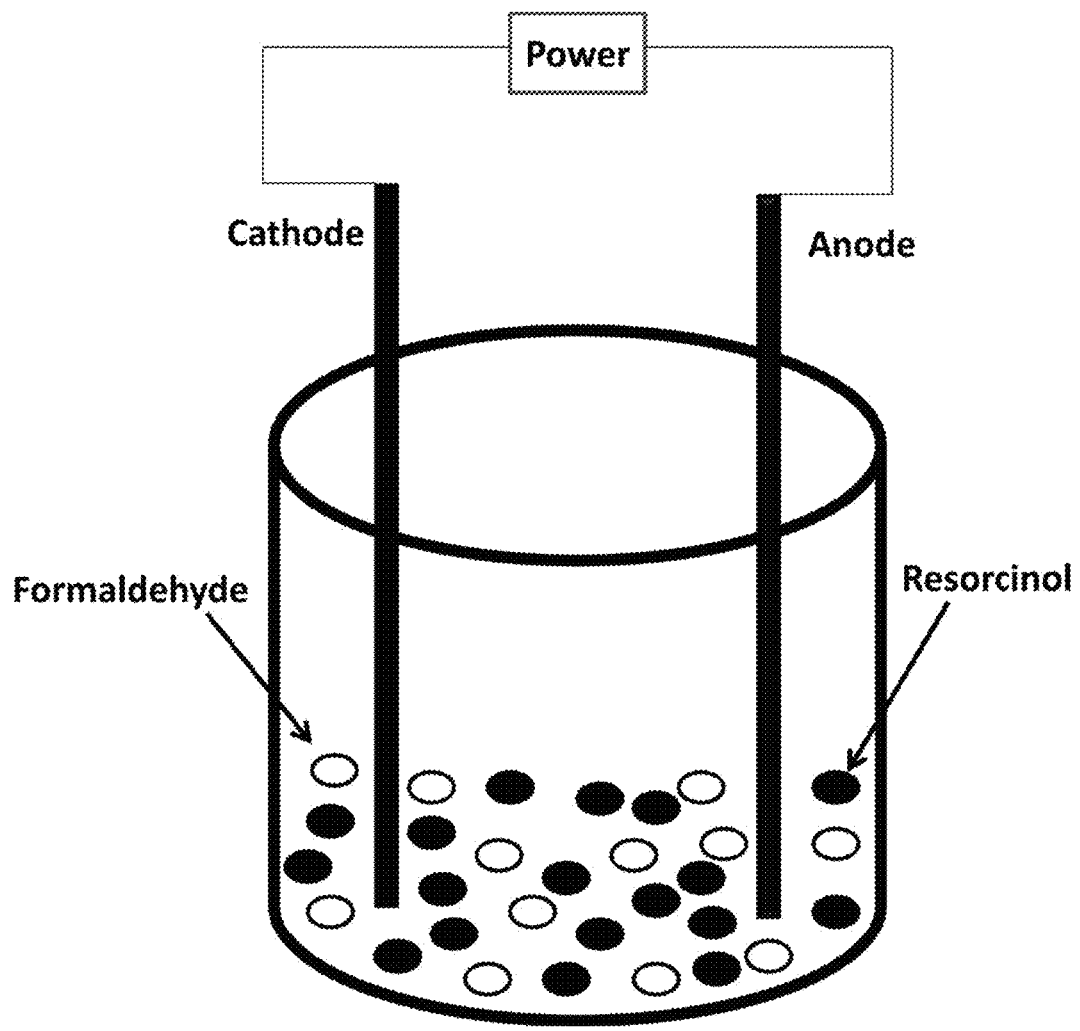
FIG. 1 illustrates a schematic drawing of reactants and components used in electrochemical polymerization process for synthesis of cross-linked gel, in accordance with the present invention.

The exemplary embodiments described herein details for illustrative purposes are subject to numerous variations in structure and design. It should be emphasized, however, that the present invention is not limited to a particular electrochemical polymerization process for preparation of cross-linked gel as shown and described. It is understood that various omissions and substitutions of equivalents are contemplated as circumstances may suggest or render expedient, but these are intended to cover the applications or implementations without departing from the spirit or scope of the claims of the present invention. Also, it is to be understood that the phraseology and terminology used herein is for the purpose of description and should not be regarded as limiting.

The use of terms "including," "comprising," or "having" and variations thereof herein is meant to encompass the items listed thereafter and equivalents thereof as well as additional items. Furthermore, the terms, "a" and "an" herein do not denote a limitation of quantity, but rather denote the presence of at least one of the referenced item.

The use of term 'room temperature' referred herein means temperature inside a temperature-controlled building or common indoor temperature ranging from 20° C. to 25° C.

In one aspect, the present invention provides an electrochemical polymerization process (hereinafter referred as 'the process') for preparation of a cross-linked gel.

The process includes mixing the reactants of a hydroxylated benzene and aldehyde in an aqueous media in an inert container to form a hydroxylated benzene and aldehyde mixture. Specifically, the hydroxylated benzene and aldehyde are mixed in the aqueous media in a predetermined molar ratio. In an embodiment, the hydroxylated benzene and aldehyde are mixed in a specific molar ratio of 1:2. However, it may be evident to those skilled in the art that various other ratios of the hydroxylated benzene and aldehyde may be used. The hydroxylated benzene compound is selected from a group comprising phenol, catechol, resorcinol, hydroquinone, phlorogucinol, and mixtures or derivatives thereof. In an embodiment, the hydroxylated benzene is resorcinol. The aldehyde is selected from any one of formaldehyde and furfural, or any mixtures or any derivatives thereof. However, it may be evident to those skilled in art to use any other aldehyde known in the art for mixing with the hydroxylated benzene compounds for preparation of the cross-linked gel.

The hydroxylated benzene and aldehyde are mixed in the aqueous media in the inert container to form a completely dissolved mixture. In an embodiment, the aqueous media is water. However, it may be evident to those skilled in art to use any other solvent which dissolves the hydroxylated benzene compounds and aldehyde compounds. Examples of such solvents include ethanol, acetone, benzene, chloroform, carbon tetrachloride, nitrobenzene, dimethylsulfoxide, ether and mixtures thereof. In an embodiment, the inert container is made of any one of glass and polypropylene.

The process includes introducing two electrodes in the inert container. The inert container having the completely dissolved hydroxylated benzene and aldehyde mixture is sealed tightly. In an embodiment, the electrodes are made of inert material.

Furthermore, the process includes supplying electric current to the completely dissolved hydroxylated benzene and aldehyde mixture in the inert container through the electrodes to form the cross-linked gel. In an embodiment, the electric current is supplied to the completely dissolved hydroxylated benzene and aldehyde mixture at room temperature for a period of 1-3 days. FIG. 1 shows the components and reactants used for the synthesis of the cross-linked gel. Specifically, FIG. 1, shows the reactants, hydroxylated benzene (for example, resorcinol) and aldehyde (for example, formaldehyde), mixed in the aqueous media (for example, water) to form a completely dissolved mixture of the hydroxylated benzene and aldehyde. The electrodes, for example a cathode and anode are immersed into the mixture and electric current is supplied through the electrodes to form the cross-linked gel. The electric current may be supplied also at higher temperatures as long as the boiling point of the aqueous media and the reactants is not approached.

The electric current supplied is direct electric current (DC). Further, the electric current supplied to the completely dissolved hydroxylated benzene and aldehyde mixture is in a range of 0-8 amperes, with voltage ranging from 0.01 to 60 Volts. Specifically, a constant direct current (DC) is supplied to the completely dissolved hydroxylated benzene and aldehyde mixture in the inert container continuously in the range of 0-8 amperes by using a controllable power supply. The electron flux in the mixture via electrodes results in formation of the cross-linked networks of gel. Controlling the flow of the DC current, controls resulting molecular mass and molecular mass distribution, crosslinking density and networks formation, enhancement of pore and physical properties in the cross-linked gels.

Specifically, the time required for formation of the threshold gelation of gel networks is about 3 hours, in which the sol color changes from clear pale yellow color to dark yellowish or brownish color, depending on used molar ratio of the hydroxylated benzene and aldehyde compounds and the supplied electric current applied. Like the conventional method, the crosslinking of monomeric molecules, for example, the hydroxylated benzene and aldehyde compounds may take many days to complete 100% of gelation. However, the exact duration of gelation depends on the ratio of the hydroxylated benzene and aldehyde used. In an embodiment, the color of complete cross-linked gels varies among yellow, pale yellow deep yellow, brown to dark red and include clusters and each cluster formed from particles assembly and these particles with diameters ranging from 120 to 1100 nm.

In an embodiment, the cross-linked gel formed is further treated with an organic solvent to carry out solvent exchange step. Addition of the organic solvent replaces water retained in the pores and networks of the cross-linked gel. The organic solvent is selected from a group comprising methanol, acetone, isopropanol, amyl acetate, and the like.

Figure 2:
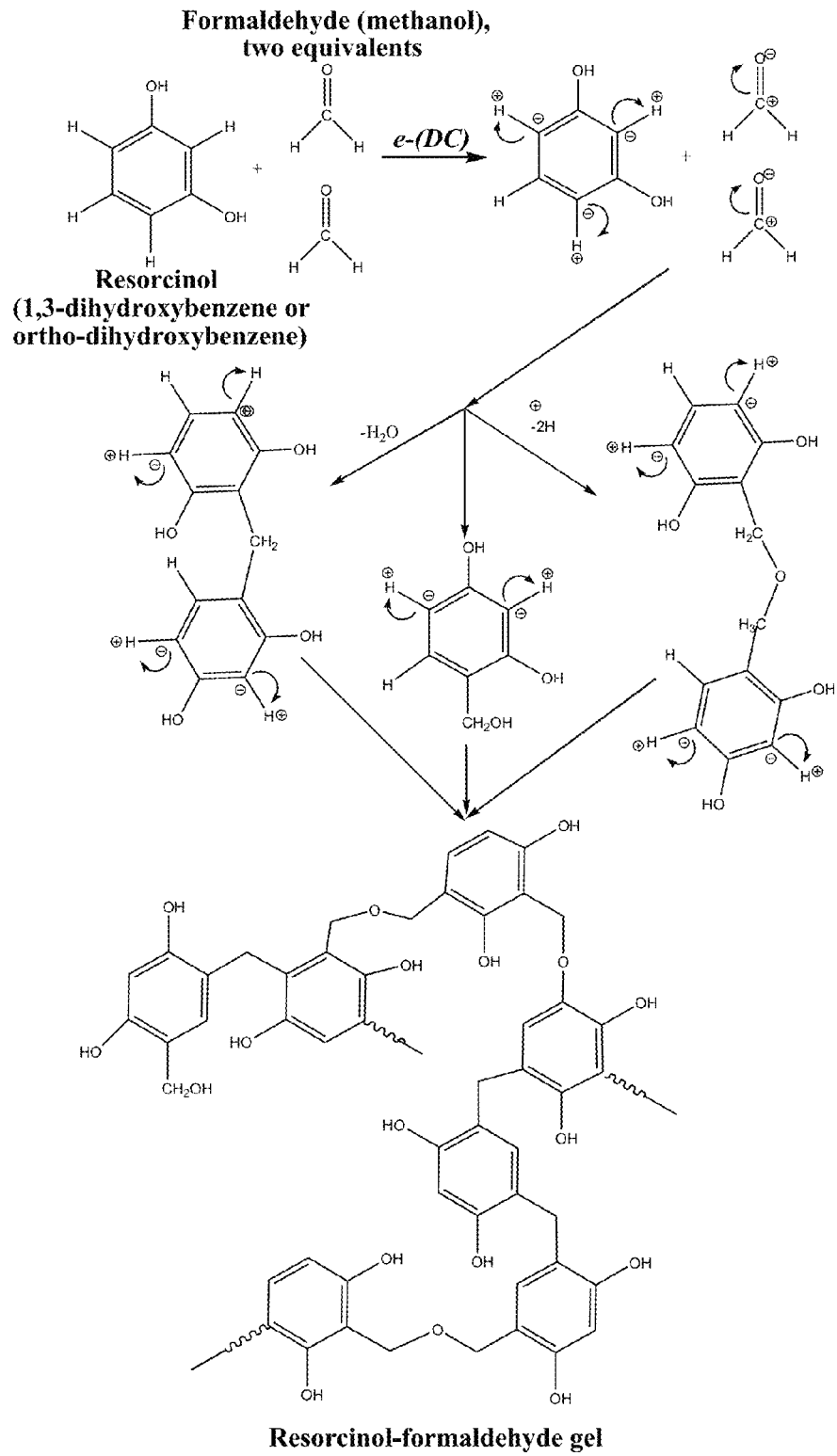
FIG. 2 illustrates a schematic exemplary mechanism of polymerization reaction upon synthesis of cross-linked gel, specifically a resorcinol-formaldehyde cross-linked gel, in accordance with an embodiment of the present invention.
Figure 3:
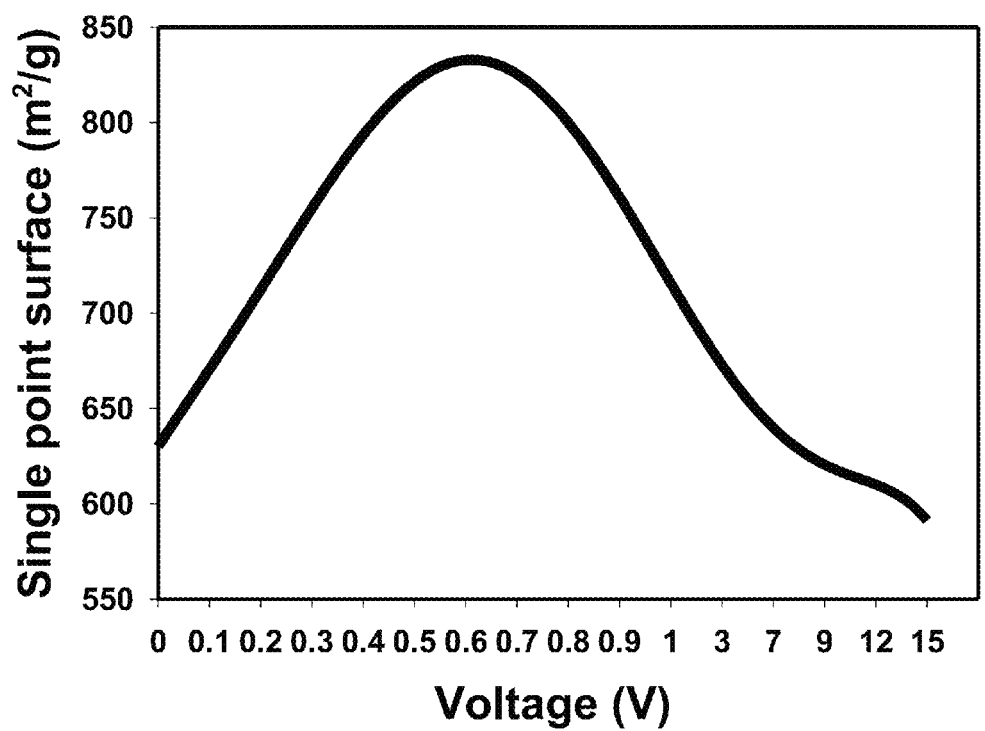
FIG. 3 illustrates a graph showing effect of applied voltage on single-point surface area of activated carbons prepared from the resorcinol-formaldehyde cross-linked gels, in accordance with an embodiment of the present invention.

The cross-linked gel formed by the electrochemical polymerization process is resorcinol-formaldehyde gel, in accordance with an embodiment of the present invention. The resorcinol-formaldehyde cross-linked gel is treated with acetone to carry out solvent exchange step as described above. The direct electric current stimulates the reactants to polymerize through an electrochemical path to form resorcinol-formaldehyde cross-linked gels as suggested mechanism shown in FIG. 2. Specifically, FIG. 2 shows that when one mole of resorcinol reacted with two moles of formaldehyde and the electric current is passed there through at predefined temperature leads to formation of the cross-linked gel. The resorcinol-formaldehyde cross-linked gel may be used as ion exchange resin, water-based resin coatings, solvent based coating resin, and resin coating. The resorcinol-formaldehyde cross-linked gel is carbonized to produce carbon gel and activated to produce activated carbon gel by physical activation process. The activated carbon gel produced from the resorcinol-formaldehyde cross-linked gel results in surface area in the range from 500 to 850 $m^2/g$ depending on the voltage used, as shown in FIG. 3. Specifically, FIG. 3 exposes that the surface area of the activated carbon gels can be easily maximized by optimizing the applied voltage value. Referring to FIG. 3, when the voltage of the supplied electric current is about 0.2 V, the corresponding surface area of the activated carbon gel is up to 700 $m^2/g$. Furthermore, when the applied voltage is increased to about 0.4 V, the corresponding surface area of the activated carbon gel is about 800 $m^2/g$; and when the applied voltage is about 0.8 V, the corresponding surface area of the activated carbon gel is about 825 $m^2/g$, which is optimum. Thereafter, increase in the applied voltage results in decreasing surface area of the activated carbon gel.

Figure 4:
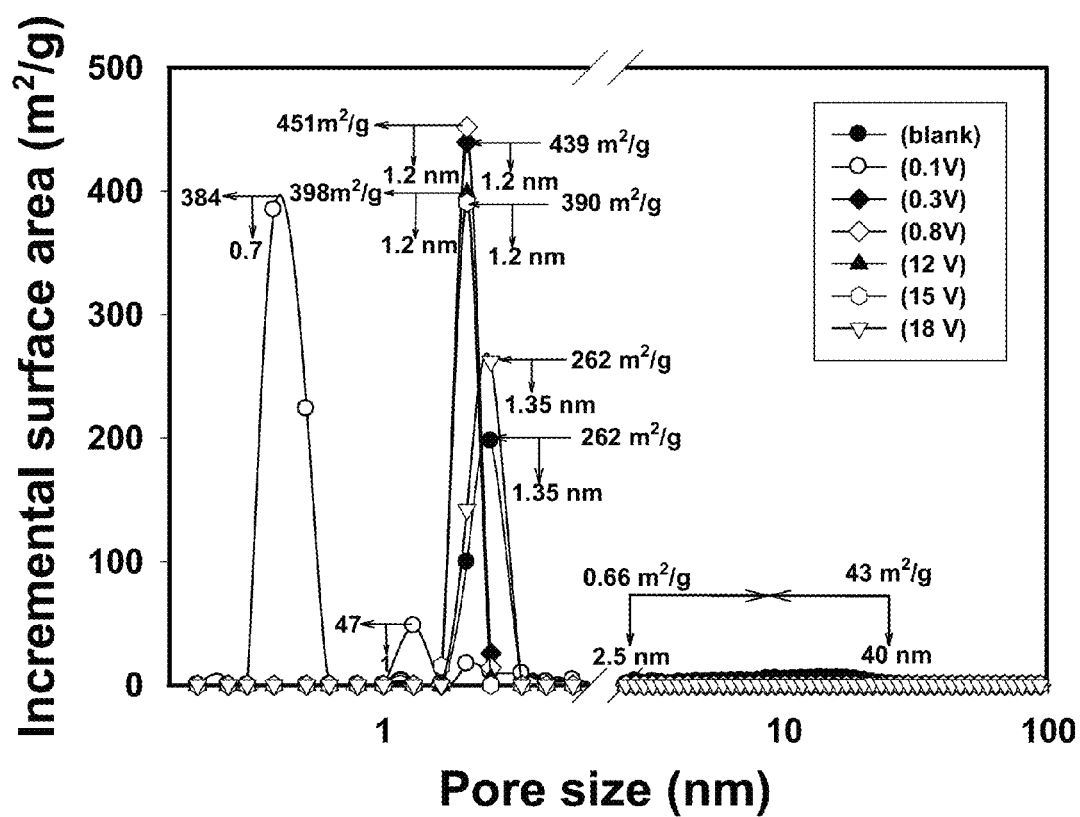
FIG. 4 illustrates a graph showing effect of applied DC voltage on resulting pore size distributions and incremental surface areas of activated carbons prepared from the resorcinol-formaldehyde cross-linked gel.

The activated carbon gel has narrow micropores (with pore widths $\leq 2$ nm) and ultra-micropores ($\leq 0.7$ m) as shown in FIG. 4. FIG. 4 depicts a graph showing effect of applied DC voltage on resulting pore size distributions and incremental surface areas of activated carbons made from the resorcinol-formaldehyde cross-linked gels of the present invention. Referring to FIG. 4, sharp peaks of pore size distribution of the activated carbon gels are achieved with the process of the present invention, and that the pore width can be controlled through the optimization of the DC current.

Figure 5:
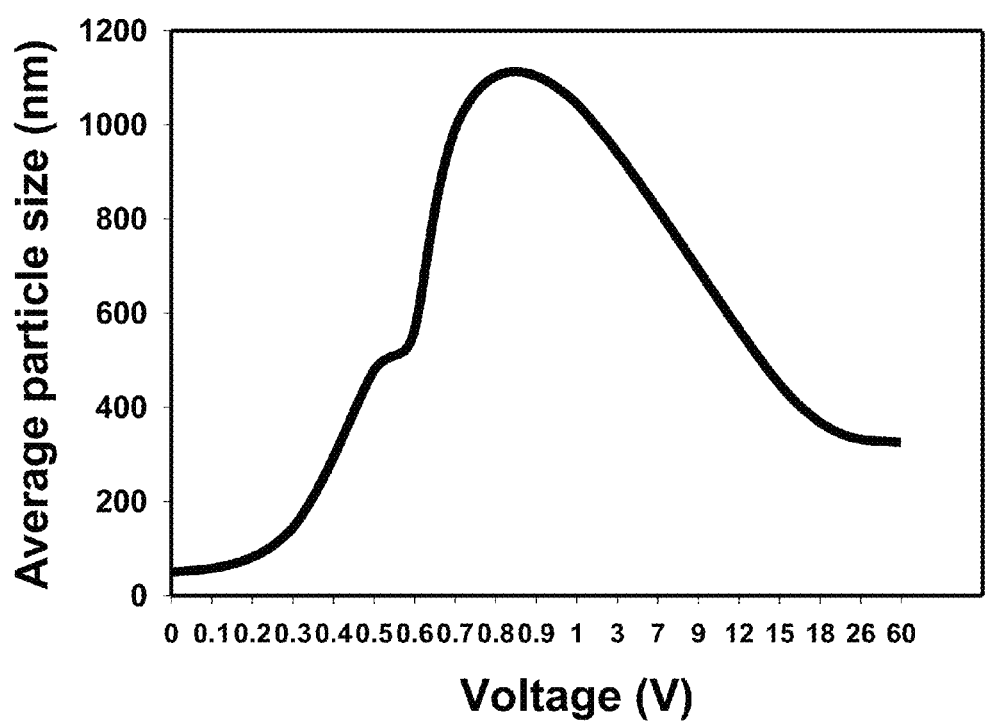
FIG. 5 illustrates a graph showing effect of voltage on average particle size of activated carbons prepared from the resorcinol-formaldehyde cross-linked gel.

Furthermore, the choice of the optimum DC current voltage leads to controllable gel particle sizes as shown in FIG. 5. FIG. 5 illustrates a graph showing effect of applied voltage on average particle size of activated carbon gels made from the resorcinol-formaldehyde cross-linked gel. Referring to FIG. 5, when the voltage of the supplied electric current is about 0.3 V, the corresponding average particle size of the activated carbon gel is about 120 nm (i.e., minimum particle size). Further, when the applied voltage is increased to about 0.6 V, the corresponding surface area of the activated carbon gel is about 600 nm; and when the applied voltage is about 0.7V, the corresponding average particle size of the activated carbon gel is about 1000 nm; and when the voltage is about 1 V, the corresponding average particle of the activated carbon gel is up to 1100 nm which is optimum (i.e., maximum particle size). Thereafter, increase in the applied voltage results in decreasing average particle size of the activated carbon gel.

The activated carbon gel produced from the resorcinol-formaldehyde cross-linked gel of the present invention with enhanced physical characteristics have their application as molds for casting aluminum metal, aerocapacitors, heat storage device for automobiles, muonium atom studies, helium phase transition studies, hydrogen fuel storage, catalysis, chromatographic separation, super capacitors, gas diffusion electrodes in proton exchange membrane fuel cells, and anodes in rechargeable lithium ion batteries.

Further, the activated carbon gels produced from the resorcinol-formaldehyde cross-linked gels have distinguished nano material characteristics ($\leq 0.7$ nm) as evidenced by their narrow and controllable pore size distribution, and controllable particle size. The nano material characteristics of the activated carbon gels qualifies them as carriers or supports for specific nano particles to be used for example in advanced industry such technology of purification and separation, and also as drug delivery systems.

Figure 6:
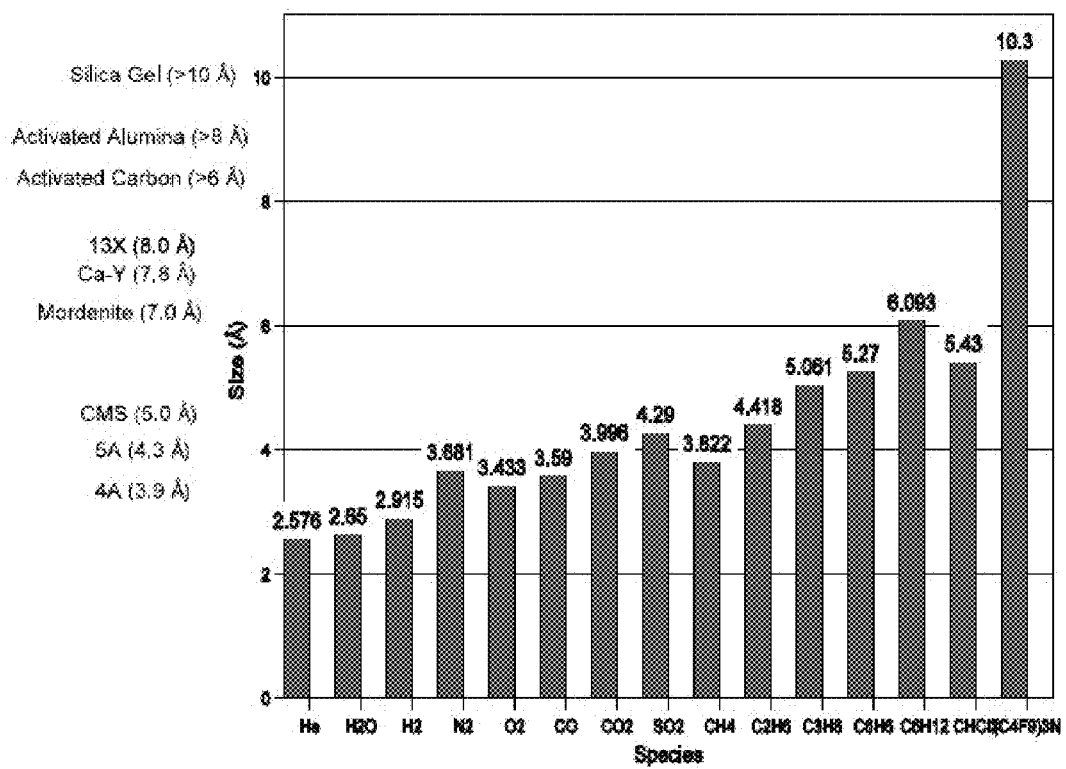
FIG. 6 illustrates typical molecular sieving materials with pore sizes suitable for separating common molecules of various molecular sizes.

Furthermore, the activated carbon gels are used as predesigned porous materials that can be tailored with specific recipes to fit specific characteristics for targeted applications. An example of such targeted application includes making predesigned activated resorcinol-formaldehyde carbon gel which is characterized with sub-nano pore width to sieve various gas molecules according to the respective sizes the gas molecules, as shown in FIG. 6.

Figure 7:
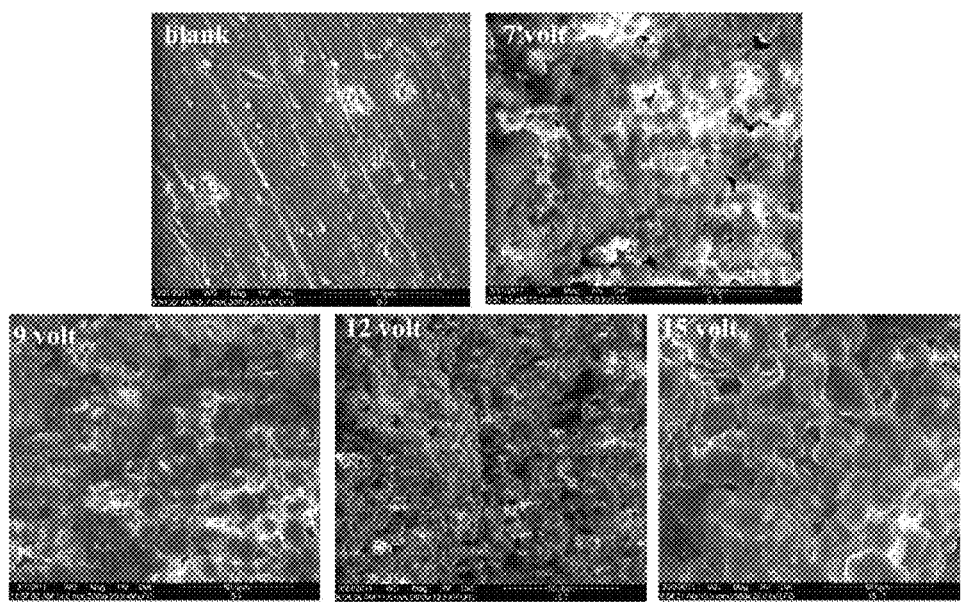
FIG. 7 illustrates scanning electron microscope (SEM) images of the resorcinol-formaldehyde cross-linked gels prepared from traditional process and the method of the present invention.

Referring to FIG. 7, there is shown the resorcinol-formaldehyde cross-linked gels having different structures and particle sizes as well. The difference in structures and particle sizes of the resorcinol-formaldehyde cross-linked gel is characteristics of various voltages as shown in the FIG. 7. Specifically, FIG. 7 shows cross-linked gels prepared using various voltages such as 7V, 9V, 12V and 15V, which have improved particle sizes against a blank sample (prepared by traditional process) of the resorcinol-formaldehyde gel corresponding to a voltage zero.

Figure 8:
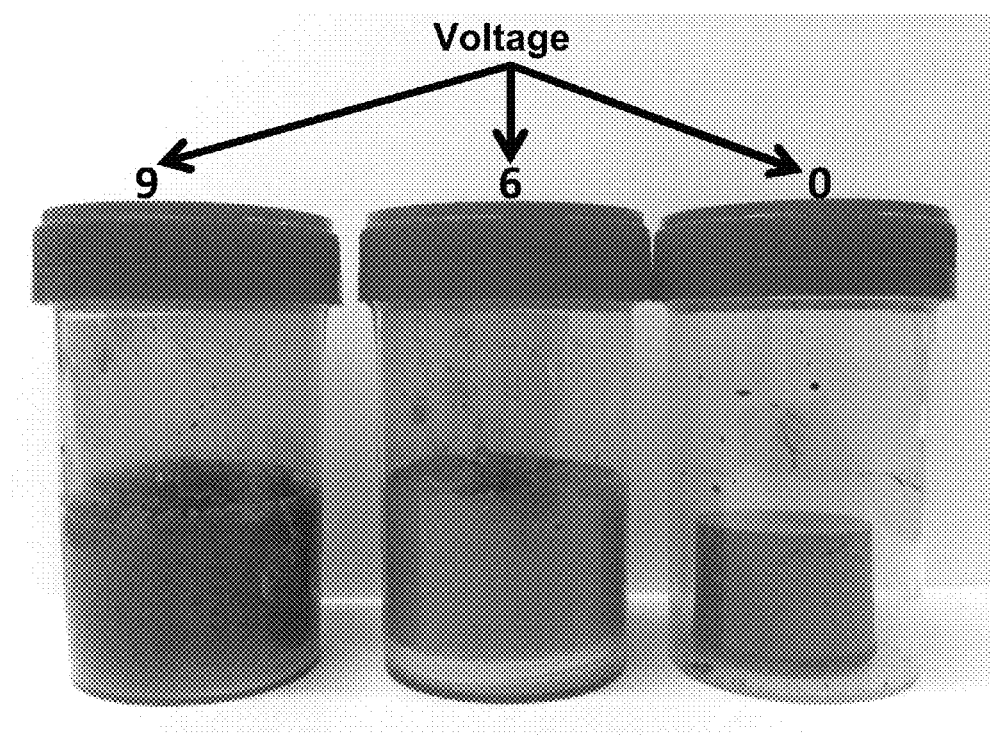
FIG. 8 illustrates morphologies of the resorcinol-formaldehyde cross-linked gels prepared by process of present invention and micrographs of the blank gel sample prepared by traditional process.
Figure 9:
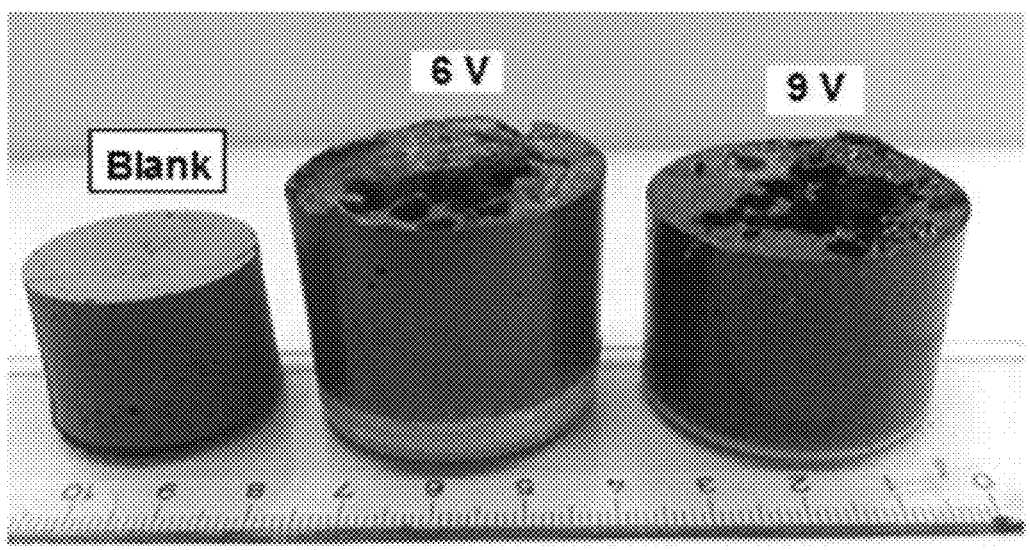
FIG. 9 illustrates prototype of the dried resorcinol-formaldehyde cross-linked gels prepared by process of present invention and prototype of the blank gel sample prepared by traditional process.

Referring to FIG. 8, the resorcinol-formaldehyde cross-linked gels when dried at ambient conditions, sustain their initial size where as a blank sample (prepared by traditional process) of the resorcinol-formaldehyde gel corresponding to a voltage zero, shrink and distort pores as a result of surface tension stress resulting from evaporation of the exchanged solvent. Specifically, as shown in FIG. 8 the blank sample of resorcinol-formaldehyde cross-linked gel corresponding to a voltage zero shrinks more as compared to the resorcinol-formaldehyde cross-linked gel of the present invention prepared at variable voltages (for example, 6V and 9V). Further, the blank sample (prepared by traditional process) of the resorcinol-formaldehyde cross-linked gel as shown in FIG. 9 shrinks in both radial and axial dimensions, whereas those prepared with the process in accordance with the present invention (shown in the FIG. 9 as prepared using 6V and 9V) sustain their radial dimension and exhibits less shrinkage in the axial dimension. Accordingly, it is ascertained that the resorcinol-formaldehyde cross-linked gels prepared with the process of the present invention exhibits enhanced physical properties, which enable them to withstand surface tension stress encountered during the ambient drying conditions.

Figure 10:
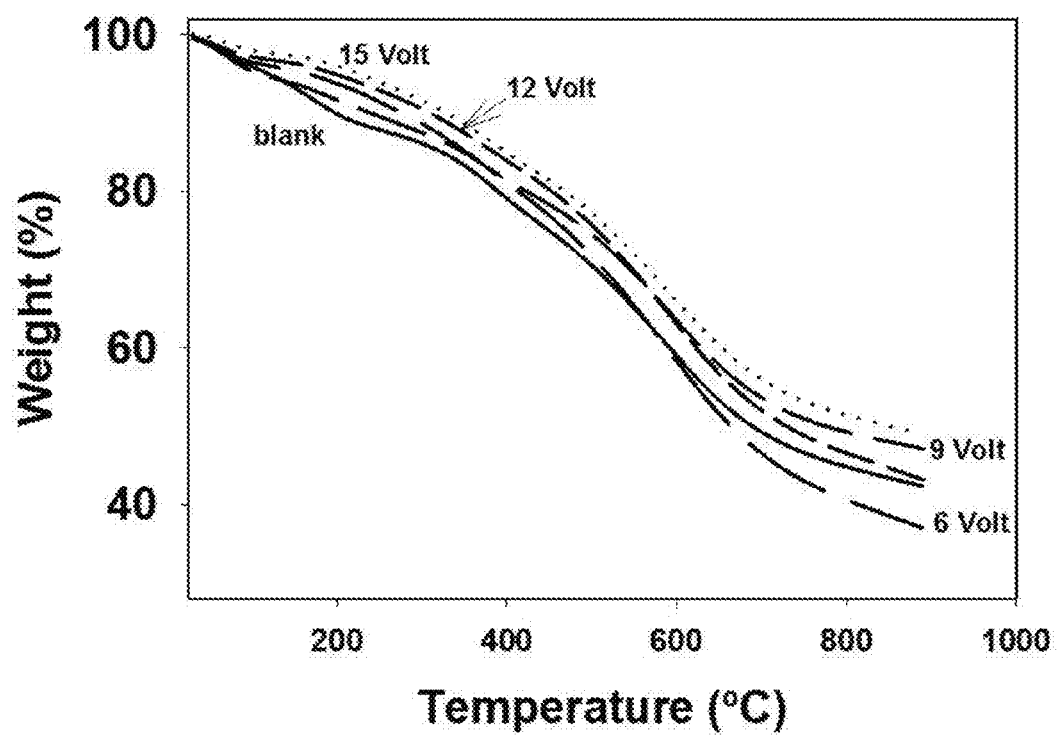
FIG. 10 illustrates thermograms for the resorcinol-formaldehyde gels prepared by electrochemical polymerization process of present invention and thermogram of the blank gel sample prepared by traditional process.

Referring now to FIG. 10, there is shown thermogravimetric analysis (TGA) thermograms of the resorcinol-formaldehyde cross-linked gels. The thermograms indicate that the resorcinol-formaldehyde cross-linked gels of the present invention exhibit an enhancement in thermal stability. Therefore, and specifically, referring to FIG. 10, the resorcinol-formaldehyde cross-linked gels prepared at applied voltages of 6V, 9V, 12V, and 15 V withstand better decomposition temperature as compared to the blank sample (prepared by traditional process) of the resorcinol-formaldehyde cross-linked gel corresponding to voltage zero. In one embodiment, the thermal stability of the cross-linked gel is enhanced in the order of 150 degree when cross-linked gel is prepared at 15 V.

Further, the resorcinol-formaldehyde cross-linked gels have clear pore structural trends as evidenced by the improved pore structures (i.e., surface area, pore size, average and particle size), thermal stability and morphology as well. Therefore, the resorcinol-formaldehyde cross-linked gels of the present invention constitute a new class of resorcinol-formaldehyde cross-linked gels that can be used in advanced applications, especially those requiring self-supporting porous materials or electrochemical conductors. Also, such applications may include, for example, natural gas storage, fuel cells electrodes, batteries, super capacitors and cosmic dust capture. In one embodiment, the cross-linked gel has a maximum particle size of 1100 nm at 1 V and a minimum particle size of 120 nm at 0.3 V.

In another aspect, the present invention provides a resorcinol-formaldehyde cross-linked gel prepared by electrochemical polymerization process, characterized by Fourier Transform Infra Red (FTIR) peaks at 294 $cm^{-1}$, 2874 $cm^{-1}$, 1479 $cm^{-1}$, 1624 $cm^{-1}$, 3444 $cm^{-1}$, 1222 $cm^{-1}$, and 1092 $\mu m^{-1}$.

Figure 11:
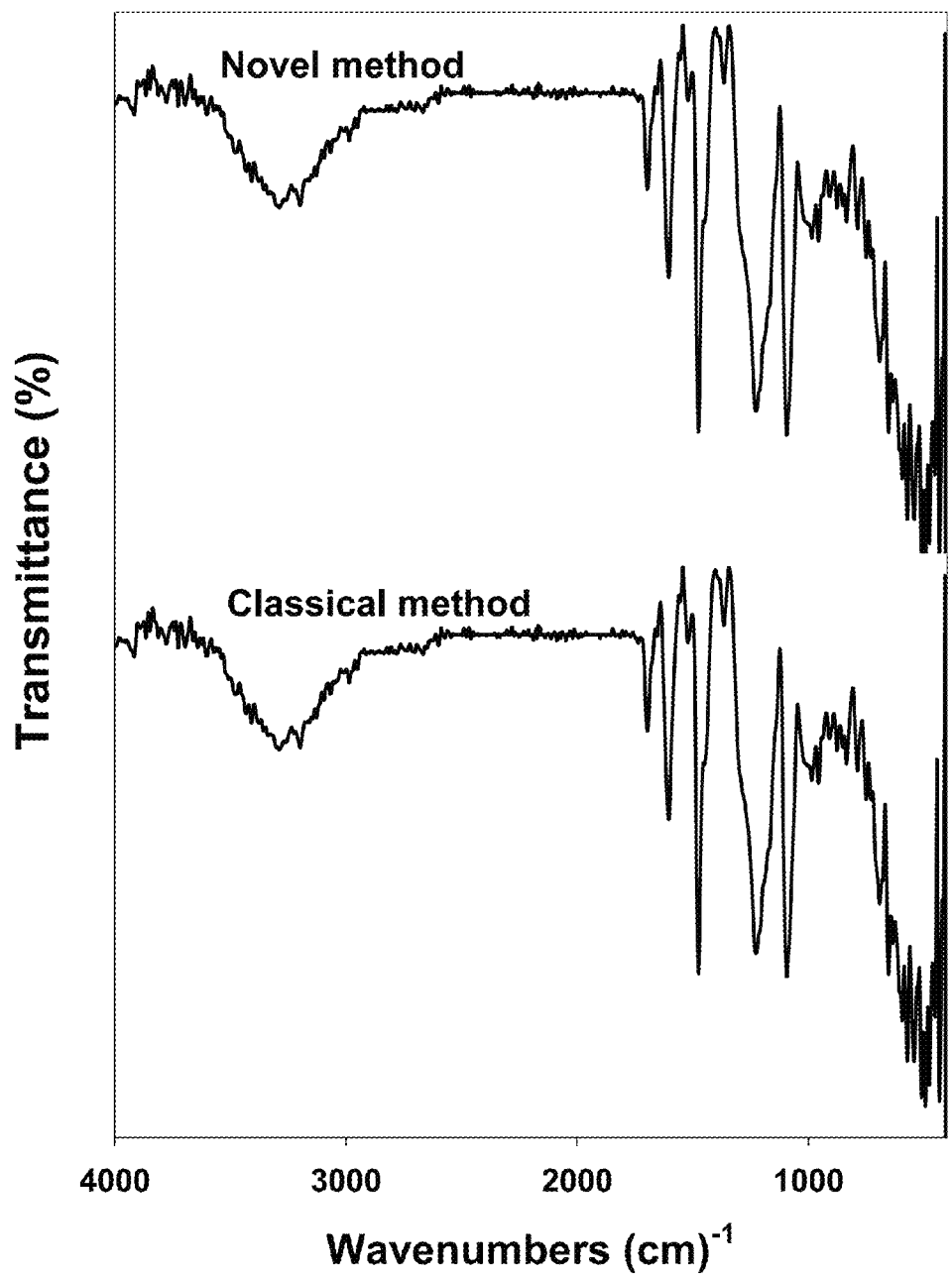
FIG. 11 illustrates a comparative graph of FTIR spectra of the resorcinol-formaldehyde gels prepared by process of present invention and the blank gel sample prepared by traditional process.

Specifically, FIG. 11 shows Fourier Transform Infra Red (FTIR) spectra of resorcinol-formaldehyde cross-linked gels. Various absorption peaks of the FTIR are evident of the presence of specific functional groups presented in FIG. 2. For example, absorption peaks at 294 $cm^{-1}$, 2874 $cm^{-1}$, and 1479 $cm^{-1}$ are related to CH stretching groups. The absorption peak at 1624 $cm^{-1}$ has been assigned to aromatic ring stretching vibrations, whereas a broad peak at 3444 $cm^{-1}$ is a characteristic for OH stretching vibration group in phenol. Furthermore, the FTIR peaks at 1222 $cm^{-1}$ and 1092 $cm^{-1}$ are associated with C—O—C stretching vibrations of methylene ether bridges between resorcinol molecules. On the other hand, the IR peak at 1720 $cm^{-1}$ which is associated to the C=O stretching of aldehyde is not observed. Accordingly, various peaks in the FTIR graphs indicate that the sol-gel reaction is complete. Further, the presence of similar FTIR peaks for the gels prepared by the process in accordance with the present invention and a blank sample corresponding to the applied voltage zero indicates that they have similar chemical identity and composition.

In an embodiment, the resorcinol-formaldehyde cross-linked gels are carbonized to form resorcinol-formaldehyde carbon gels and activated to form resorcinol-formaldehyde activated carbon gels. Increase in surface area of the activated carbon gels, presence of micropores and ultra micropores in the activated carbon gel, and sharp narrow peaks of pore size distribution thereof is already described in hereinabove with reference to FIGS. 3, 4 and 5, and is not described again for the sake of brevity of the disclosure.

Further, the resorcinol-formaldehyde cross-linked gels exhibit an enhanced thermal stability compared to the blank sample corresponding to voltage zero, as shown in FIG. 10 which is already described hereinabove and is not described again for the sake of brevity of the invention.

The foregoing descriptions of specific embodiments of the present disclosure have been presented for purposes of illustration and description. They are not intended to be exhaustive or to limit the present disclosure to the precise forms, and obviously many modifications and variations are possible in light of the above teaching. The embodiments were chosen and described in order to best explain the principles of the present disclosure and its practical applications, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the numerous applications or numerous implementations without departing from the spirit or scope of the claims of the present disclosure.

The invention claimed is:

1. An electrochemical polymerization process for preparation of cross-linked gel, the process comprising:
   mixing a hydroxylated benzene and an aldehyde in an aqueous media in an inert container to form a hydroxylated benzene and aldehyde mixture;
   introducing two electrodes into the inert container; and
   supplying electric current to the hydroxylated benzene and aldehyde mixture in the inert container through the two electrodes.

2. The electrochemical polymerization process of claim 1, wherein the hydroxylated benzene and the aldehyde are mixed in a molar ratio of 1:2.

3. The electrochemical polymerization process of claim 1, wherein the aqueous media is selected from the group consisting of water, ethanol, acetone, benzene, chloroform, carbon tetrachloride, nitrobenzene, dimethylsulfoxide, ether and combinations thereof.

4. The electrochemical polymerization process of claim 1, wherein the electric current is supplied to the hydroxylated benzene and aldehyde mixture at room temperature for a period of 1-3 days.

5. The electrochemical polymerization process of claim 1, wherein the electric current supplied to the hydroxylated benzene and aldehyde mixture is in a range of ≤8 amperes.

6. The electrochemical polymerization process of claim 1, wherein the hydroxylated benzene is selected from the group consisting of phenol, catechol, resorcinol, hydroquinone, phlorogucinol, and combinations thereof.

7. The electrochemical polymerization process of claim 1, wherein the aldehyde is selected from the group consisting of formaldehyde, furfural, and combinations thereof.

8. The electrochemical polymerization process of claim 1, wherein the cross-linked gel is a resorcinol-formaldehydegel.

9. The electrochemical polymerization process of claim 1, wherein the crosslinked gel is carbonized to produce resorcinol-formaldehyde carbon gel.

10. The electrochemical polymerization process of claim 1, wherein the cross-linked gel is physically activated to produce resorcinol-formaldehyde activated carbon gel.

11. An activated resorcinol-formaldehyde cross-linked gels of claim 10, wherein the activated carbon gel has micropores less than 2 nm and ultra-micropores less than 0.7 nm.

12. The electrochemical polymerization process of claim 1, wherein the cross-linked gel is treated with an organic solvent selected from a group comprising methanol, acetone, isopropanol and amyl acetate.

13. The electrochemical polymerization process of claim 1, wherein the inert container is made of any one of glass and polypropylene.

14. The electrochemical polymerization process of claim 1, wherein the thermal stability of the cross-linked gel is enhanced in the order of 150 degree centigrade when crosslinked gel is prepared at 15 V.

15. The electrochemical polymerization process of claim 10, wherein the activated carbon gel has a maximum particle size of 1100 nm at 1 V and a minimum particle size of 120 nm at 0.3 V.

16. A resorcinol-formaldehyde cross-linked gel prepared by an electrochemical polymerization process, characterized by Fourier Transform Infra Red (FTIR) peaks at 294 $cm^{-1}$, 2874 $cm^{-1}$, 1479 $cm^{-1}$, 1624 $cm^{-1}$, 3444 $cm^{-1}$, 1222 $cm^{-1}$, and 1092 $cm^{-1}$, wherein the cross-linked gel is physically activated to produce resorcinol-formaldehyde activated carbon gel, and wherein the activated carbon gel has micropores less than or equal to 2 nm and ultra-micropores less than or equal to 0.7 nm.

* * * * *